March 22, 1960  W. R. JOHNSTON  2,929,150
DEHYDRATION
Filed May 7, 1956
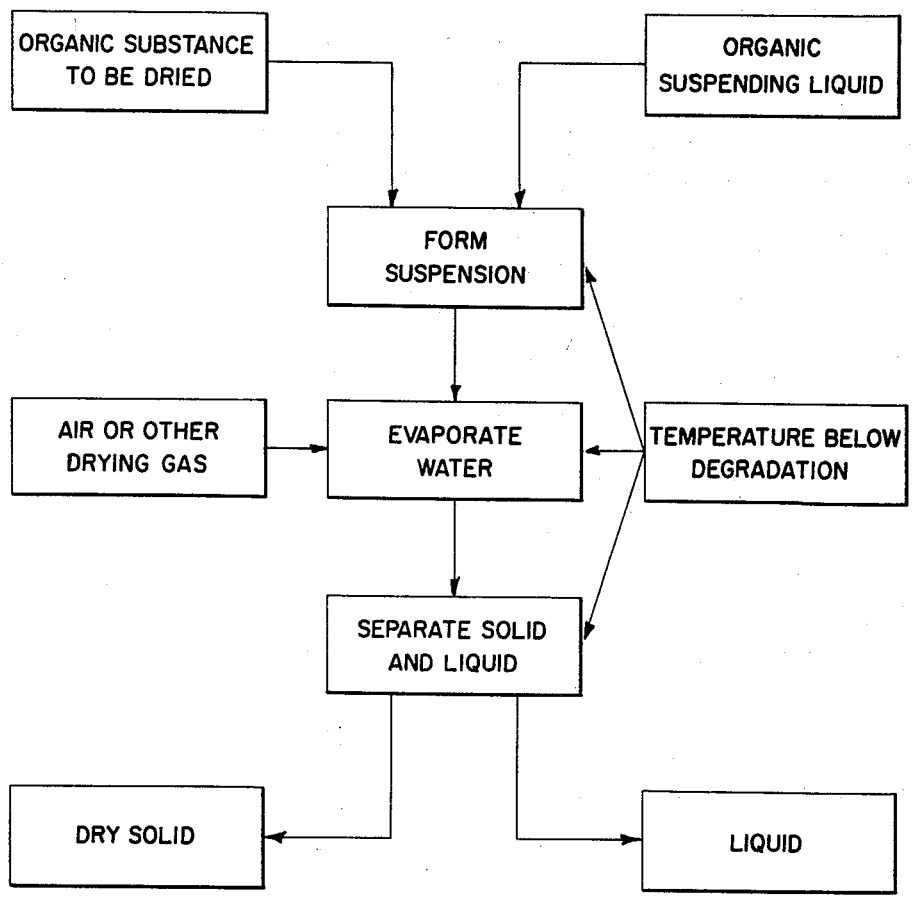
INVENTOR
WILLIAM R. JOHNSTON
BY
John S. Lachowicz
ATTORNEY 2,929,150
Patented Mar. 22, 1960

2,929,150

DEHYDRATION

William R. Johnston, Chappaqua, N.Y., assignor to Standard Brands Incorporated, New York, N.Y., a corporation of Delaware Application May 7, 1956, Serial No. 582,909

17 Claims. (Cl. 34—9)

This invention relates to a new method of dehydrating a wide variety of substances and is particularly advantageous for dehydration of heat sensitive matter. It also relates to new products produced by this method.

Many substances, especially those of organic origin, such as foods, microorganisms and biologicals, are heat sensitive and therefore difficult to dehydrate satisfactorily by means of existing commercially applicable methods. The main difficulty in dehydrating heat sensitive substances on a commercial scale resides in introducing the required heat of evaporation under such conditions that minimum damage is inflicted on the substance dehydrated.

The major factors in controlling a dehydration process are the temperature level, the uniformity of heat distribution and the rate of heat introduction. Which of these three factors is most important depends entirely on the dehydration problem at hand. In most instances the desired results of the dehydration process depend on the proper combination of two or all of these factors.

Most substances, especially those of organic origin, are in a complicated state of dynamic equilibrium during dehydration. The chemical composition and the physical structure change continuously as the dehydration progresses. If the substance is of natural organic origin, the changes taking place during dehydration will be physical, chemical and biological. The end result of these changes is a function of the proper balance of the above mentioned three major factors.

The past art of dehydration of heat sensitive substances has been developed on the erroneous assumption that the temperature level is the sole controlling factor in protecting the quality of such substances. Low temperature air drying, reduced pressure drying and freeze drying are the best examples of the prior art.

There are three commercially feasible methods for introducing heat into a substance, viz.: conduction, convection and radiation. The prior art dehydration processes designed to protect the heat sensitive drying substance by operation at low temperature, making use of reduced pressure drying and/or freeze drying, introduce heat by conduction and/or radiation. In the case of conduction and radiation a uniform distribution of heat and a uniform heat input rate are a physical impossibility on a commercial scale. This is due to the fact that the solids being dehydrated invariably offer an inadequate area of contact with solid heat transfer surfaces for conducted heat transmission, and radiation has an inadequate penetration power for uniform heating. The result is poor heating control, variable heat transfer rate, local overheating, case hardening and even scorching of the material dehydrated. Hence, at best there will be lack of uniformity in the product obtained, and in many instances where the success of the dehydration process depends on maintenance of the dynamic equilibrium in the dehydrating material by means of proper balance of the three major factors in the drying process, the valuable properties of the material may be entirely destroyed.

A typical example of such a phenomenon is freeze drying of yeast. Yeast may be frozen without destroying its activity; it may be dehydrated without destroying activity, but freeze drying of yeast under the conditions of commercial thermal control of this process renders the yeast substantially inactive.

Hence, although these drying processes have been designed for dehydrating heat sensitive substances under the protection of a low temperature, they do not succeed in commercial scale equipment, except for certain specific applications because the two other factors, uniform heat distribution and uniform heating rates, cannot be attained in large scale operations at a cost which such operations can afford. For this reason such drying techniques have been limited in their commercial applications to high priced products such as drugs where cost of dehydration is of no consequence.

On the other hand, dehydration by convection heating offers every possibility for fulfilling the requirements for dehydrating heat sensitive substances under complete thermal control, i.e., control of temperature, heat distribution and heat input. This is possible because in convection heating a fluid is used as the heat transfer medium, and, given the opportunity, a fluid will surround every discrete particle and penetrate every crevice of the substance to be dehydrated. This is the first basic requirement in successful convection heating. The second basic requirement is that the fluid heat transfer medium be given a chance of free circulation around every discrete particle of the substance to be dehydrated, or that every discrete particle have a chance of circulating freely in the fluid heat transfer medium. This second requirement will be referred to as "heat transfer through dynamic contact."

The heat transfer fluid may be a liquid or it may be a gas. In the prior art of drying solid substances, both of these heat transfer media have been used singly but not in combination. A gas may serve both as a heat transfer medium and as a mass transfer medium, i.e., water vapor transfer medium.

When a liquid is used as the heat transfer medium without a gaseous vapor transfer medium, the temperature must be at or above the boiling point of water before dehydration will take place. This is ordinarily too high for heat sensitive organic substances. Vacuum may be used to depress the boiling point of water, but this introduces difficulties in the drying rate control and increases the equipment and operating expenses substantially. Such a process is described in British Patent 582,611 according to which a suspension of the material to be dehydrated in a liquid heat transfer medium is heated and subjected to vacuum in bulk. Unless the temperature is high, the vapor pressure of the water will be low and a high vacuum will be required for evaporation. Furthermore, since the major portion of the water to be evaporated is occluded in the bulk of the material, the vacuum at the surface of the material is relatively ineffective and evaporation is too slow to be of commercial significance.

In the present invention when a gaseous water vapor transfer medium is passed through the suspension while under vacuum, there is substantially no bulk effect since the path of the water vapor is reduced to the distance to the nearest air bubble in the bulk of the material, while in the process of British Patent 582,611 the water vapor in the bulk of the material must find its way to the surface of the bulk. This, of course, requires higher bulk temperatures than indicated by the vacuum used. An additional advantage in the present invention resides in the fact that the relatively dry air, used in conjunction with a vacuum, sweeps the water vapor out of the suspension and thus lowers the required operating temperature below the equilibrium temperature indicated by the prevailing vacuum. Furthermore, in the present invention the contacts between the heat transfer medium, the water vapor transfer medium, and the substance to be dehydrated are dynamic and dehydration takes place under conditions which protect heat sensitive substances.

According to the prior art of dehydrating substances with a gas serving to transfer both heat and vapor, the substance is supported in bulk on trays, screens, belts or in or on revolving drums. These methods do not provide adequate contact between the gas and the substance being dehydrated, and full advantage of the gas as heat transfer and vapor transfer medium has not been realized.

An object of the invention is to provide an improved dehydration process.

Another object of the invention is to provide a dehydration process which may be conducted under more complete control of temperature, heat distribution and heat input rate than has been attained heretofore.

A further object of the invention is to provide a process for dehydrating solid substances by dynamic contact with a liquid heat transfer medium and a gaseous water vapor transfer medium.

Another object of the invention is to provide improved dehydrated products, particularly from heat-sensitive materials.

One procedure for carrying out the process of the invention is illustrated in the attached flow diagram.

In accordance with the invention a water-containing solid substance is immersed or suspended in a non-aqueous liquid medium and water is removed in the form of vapor from the substance while it is so immersed or suspended by contacting the liquid medium with a relatively dry gas, for instance, by passing the gas through the medium. The process may be carried out at any desired pressure including subatmospheric pressure.

The term "non-aqueous liquid medium" is used herein to include any liquid other than water. The medium should not have a deleterious effect on the substance to be dehydrated and preferably should not be volatile at the dehydrating temperature. In some instances it may be desirable to use a volatile liquid medium in order to facilitate its removal from the dehydrated product. The liquid volatilized and carried away by the gaseous water vapor transfer medium should be replaced in order to maintain the liquid suspension of the substance being dehydrated. For example, an aqueous coffee extract may be dehydrated in octane in a closed system wherein volatilized octane is condensed and returned to the vessel in which the dehydration is taking place.

It is feasible to use in many instances liquid media which are miscible with water, for instance, glycerine, and they may contain water at the time of mixing with the substance to be dehydrated. Examples of other suitable media are the animal oils, the vegetable oils such as corn oil, peanut oil and cottonseed oil, mineral oils such as light mineral oil and heavy mineral oil (Nujol), silicone oil, triethyl citrate, tributyl citrate, dibutyl phthalate and liquid propane. The chemical and physical properties of the substance to be dehydrated and the use to which it is to be put will dictate to some extent the type of liquid medium to be used. In the case of foods for instance it is desirable to use an edible liquid medium, for example the animal, vegetable and highly refined mineral oils.

If the liquid medium has some solvent action on water it will transfer water to the gas used as a water vapor transfer medium at a higher rate. For instance, the drying rate in corn oil is considerably higher than in mineral oil. The rate of water transfer may be increased by incorporating in the liquid medium a wetting agent, for instance the Spans (fatty acid esters of sorbitan), the Tweens (polyoxyethylene derivatives of sorbitan esters) and lecithin. These agents may act by increasing the solubility of water in the liquid medium or by promoting emulsification of water in the liquid medium.

The substance to be dehydrated is preferably suspended in the liquid medium in the form of relatively small particles and the water is evaporated while the particles are in the suspended state. This state may be maintained for example by vigorous agitation mechanically or by passing the gaseous dehydrating agent through the liquid medium. If it is desired to dehydrate a substance in the form of relatively large pieces they may be supported in the liquid medium on screens, in wire baskets or in like manner. The use of a liquid as the heat transfer medium permits dispersion of the substance to be dehydrated throughout the liquid medium regardless of the physical state of such substance. Plastic and sticky substances which are difficult or impossible to dehydrate by other methods may be readily dehydrated by this method. With the substance dispersed in the liquid medium and vigorous agitation by passage of the gaseous dehydrating agent through the dispersion, dynamic contact is automatically obtained between the substance, the liquid and the gas.

For transferring the water vapor any gas may be used which does not have an undesirable action on the substance to be dehydrated and on the liquid medium. For instance, air, nitrogen and carbon dioxide are suitable. The gas should, of course, be relatively dry, that is, its humidity should be below that corresponding to equilibrium humidity relative to the substance being dehydrated.

The required heat of evaporation may be supplied by heating the gas, the suspension or both. The gas may be passed through the suspension or the suspension may be brought into contact with the gas in a subdivided condition as by spraying into a body of the gas whereby ideal dynamic contact is obtained for both heat transfer and water vapor transfer. When heating is accomplished by passage of heated gas through the suspension it is desirable in the interest of efficient heat transfer to introduce the gas through small orifices or nozzles at the bottom of the vessel containing the suspension. The smaller the orifices and the higher the gas velocity the greater the heat transfer efficiency. With orifices $\frac{1}{16}$ inch in diameter and a gas velocity of 185 feet per second, the heat transfer from gas to liquid is substantially instantaneous and of 100% efficiency.

The described process can be used for dehydrating any solid substance and solutions or suspensions of solid substances including for instance biologicals, meat, fish, eggs, vegetables, fruits and other foods. The following are examples of such substances:

Enzyme systems, antibiotics, blood, glands, viruses, apples, pears, bananas, apple sauce, orange juice, tea and coffee extracts, hamburger, potatoes, spinach, beets, onions, wheat flour, cooked Wheatena, molasses, honey and corn syrup.

In the appended claims the term "water-containing solid substance" is used to include not only water-containing substances in the solid state but also solutions or suspensions of such substances in water.

The dehydration is continued until the moisture content of the product has been reduced to the desired degree. The bulk of the liquid medium is then separated by decantation, filtration or centrifugation. In some cases the residual liquid medium may not be undesirable and need not be removed. It may be removed if desired by extraction with a suitable organic solvent.

The dehydrated products of the present invention are greatly superior to products dehydrated by other known methods. This is particularly true in the case of heat sensitive substances.

Many foods and industrial products of gelatinous nature, such as gelatin, agar agar and carrageenin, are extremely troublesome to dehydrate because of their high viscosity and tendency to form a "skin" or partially dehydrated surface film during drying which impedes evaporation and results in case hardening as soon as the solid state is reached in the drying cycle. All of these problems may be eliminated by application of the present invention since the gelatinous materials remain in a dispersed state in the liquid suspension and heat transfer medium during the entire drying cycle.

Corn hydrolysates of high dextrose equivalent are difficult to dehydrate. Hydrolysates with a dextrose equivalent as high as 42 are available on the market both as syrup and in the dehydrated state. Hydrolysates having a higher dextrose equivalent are marketed only as syrups since none of the presently used commercial dehydration methods are capable of dehydrating such products. These products can be readily dehydrated by the method of the present invention.

The invention is illustrated by the following specific examples:

*Example 1.*—To 250 grams of a commercial liquid egg white (12% solids) was added 125 grams of cane sugar and the mixture was stirred until the sugar was completely dissolved. This solution was added to 3.5 liters of corn oil, the mixture was heated to 104° F. and dehydrated to 3% moisture by passing air of 14% relative humidity at 77° F. through the suspension for 6 hours at the rate of 2.5 cubic feet per minute. After the dehydration was completed, the bulk of the oil was removed in a basket type centrifuge, the residual oil extracted by means of ethyl ether and the ethyl ether evaporated by exposing the product to 110–120° F. in a drying oven for 12 hours.

The product obtained was greatly superior in quality to dried egg whites prepared by other methods and essentially equal in quality to fresh liquid egg whites. The product was substituted for commercial liquid egg white in an angel food cake formula and the cake evaluated for quality against a cake baked from the original liquid egg white. Beating time and cake volume were equal for the two products. However, grain, texture and eating quality were rated better for the cake prepared from the dehydrated egg white.

*Example 2.*—1,000 grams of a commercial sugar yolk containing 10% sucrose with a total solids content of 50% was dispersed in 18.2 liters of corn oil. The sugar yolk was dehydrated to a moisture content of 2.2% by passing air of 14% relative humidity at 77° F. through the dispersion at the rate of 5.3 cubic feet per minute for 4¾ hours, the dispersion being maintained at 95° F. for the first ¾ hour, at 104° F. for the next hour and at 113° F. for the final 3 hours. After the dehydration was completed the bulk of the oil was removed by filtration. The original sugar yolk had a lipid content of 48.8% while the dried product had a lipid content of 56.7%.

Sponge cakes were made by a standard recipe from this dehydrated product, from the original sugar yolk and from a commercial dried yolk. Beating time, cake volume, grain, texture and eating quality were substantially equal in the case of the dehydrated sugar yolk and the original sugar yolk, whereas in the case of the commercial dried yolk all of these characteristics were extremely poor and the cake was completely unacceptable.

In processing eggs, care must be taken not to destroy the functional properties of the eggs. The dominant functional property of whole eggs and egg white is the so-called whipping power; other functional properties of whole eggs are binding power and emulsifying power. The retention of whipping power may be used as the criterion of a satisfactory dehydration process. It is destroyed in many ways, chief of which is exposure to excessive temperatures.

The temperature tolerance of the eggs is a function of many factors, most important of which are the pH of the egg and the moisture content. For these reasons no definite safe dehydrating temperature may be specified except to say that it ranges between 140° F. for fresh eggs and 158° F. for dehydrated eggs. In other words the temperature tolerance is commensurate with the degree of dehydration.

*Example 3.*—Eight pounds of a commercial aqueous extract of Irish moss, containing 2% carrageenin were dispersed in 0.6 gallons of corn oil at 113° F. in a stainless steel tank provided at the bottom with an air sparger with 60 orifices of ¹⁄₁₆ inch diameter. Maintaining the temperature at 113° F., air of 20 grains humidity per pound of dry air was passed through the sparger at a rate of 20 cubic feet per minute for 10 hours. At the end of this time the moisture content of the carrageenin was reduced to 8%. The bulk of the oil was removed in a basket type centrifuge and the residual oil extracted by means of methylene chloride. The resulting product was a free flowing powder which retained all the functional properties of the carrageenin.

*Example 4.*—Peeled, raw potatoes were diced into ⅜ inch cubes and blanched in boiling water for 5 minutes. After draining the potatoes were immersed in 3 pounds of corn oil per pound of potatoes and the batch maintained at 160° F. while forcing through it air of 14% relative humidity at 75° F. at a rate of 2.5 cubic feet per minute per pound of potatoes in the batch. The air was introduced through a perforated pipe coil at the bottom of the containing vessel. The vigorous turbulence caused by the air kept the potatoes well distributed in the oil. After 12 hours of aeration the moisture in the potatoes was reduced to 8.2%. Rehydrated and cooked, the potatoes had satisfactory flavor and consistency.

*Example 5.*—A dispersion of 100 grams of 54 D.E. corn syrup in 5 liters of corn oil was heated to 140° F. and maintained at that temperature using hot water in the jacket of a stainless steel tank while air of 14% relative humidity at 75° F. was introduced into the suspension through sixty ¹⁄₁₆ inch orifices at the bottom of the tank. After 3 hours aeration at the rate of 5 cubic feet per minute, the moisture content was reduced to 2.3%. Centrifuged to remove the bulk of the oil and extracted with methylene chloride, the product obtained was a smooth, free flowing powder.

*Example 6.*—A dispersion of 700 milliliters of a commercial aqueous extract of roasted coffee, containing 78.2% water, in 5000 milliliters of corn oil was heated to 95° F. and dehydrated by passing through it air containing 20 grains of moisture per pound from sixty ¹⁄₁₆ inch orifices located at the bottom of the containing vessel. After 6 hours aeration at the rate of 5 cubic feet per minute, a coffee powder containing 2.5% moisture and 4.2% oil was recovered by centrifugation. Extraction of the powder with 4 parts of methylene chloride reduced the oil content to 0.64%. The flavor and aroma of the coffee were found to be well preserved.

*Example 7.*—Bacillus subtilis was propagated on a nutrient medium to produce exocellular amylase. The bacterial mat was separated from the wort by centrifugation. The wort, containing 7.5% solids, was dispersed in corn oil in the ratio of 0.6 to 1.0 by volume, and the dispersion was heated to 86° F. while air of 14% relative humidity at 75° F. was passed through it for 30 hours. The dehydration was completed by heating the dispersion to 136° F. and continuing the aeration for 1.5 hours. Separation of the oil by centrifugation and solvent extraction yielded a solid having 10.8% moisture with an amylase potency from 17,000 to 48,000 liquefons per gram.

*Example 8.*—Ordinary bakers white flour containing 14% moisture was suspended in corn oil and then dried by blowing air through the suspension. One batch was dried down to 5% moisture while maintaining the suspension at 95° F. Another batch was dried down to 3% moisture while maintaining the suspension first at 95° F. and then at 113° F. A third batch was dried down to 1% moisture by raising the temperature of the suspension at the end to 140° F. All three of these products were very stable at room temperature and had a baking quality equal to that of the original flour. The original flour on the other hand does not keep well and must be stored in a cool place.

While corn oil is specified as the liquid medium in the foregoing specific examples it is to be understood that in each example any liquid medium may be substituted for the corn oil so long as it does not have a deleterious effect on the substance being dehydrated.

Referring to Example 3, aqueous solutions of carrageenin have been dehydrated in tributyl citrate and in paraffin oils containing a wetting agent, for example 0.2% Span 85. In all cases the functional properties of the carrageenin were retained during the dehydration.

Since certain changes in carrying out the above process, and certain modifications in the product may embody the invention without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process of drying a water-containing solid, organic, non-living substance sensitive to relatively low temperatures, which comprises suspending relatively small particles of the substance in a non-aqueous, organic liquid medium which is not deleterious to the substance and drying the substance by evaporating water from the suspension, while maintaining the suspension at a temperature below that to which the substance is sensitive, by bringing the suspension into intimate contact with a gas not harmful to the substance while maintaining the substance in suspension.

2. A process of drying a water-containing, solid, organic, non-living substance sensitive to relatively low temperatures, which comprises suspending relatively small particles of the substance in a non-aqueous liquid medium which has some solvent action on water and is not deleterious to the substance and drying the substance by evaporating water from the suspension, while maintaining the suspension at a temperature below that to which the substance is sensitive, by bringing the suspension into intimate contact with a gas not harmful to the substance while maintaining the substance in suspension.

3. The process as defined by claim 1 wherein the gas is passed through the suspension.

4. The process as defined by claim 3 wherein the medium is an edible oil.

5. The process as defined by claim 3 wherein the medium is an edible oil and the gas is air.

6. The process as defined by claim 3 wherein the medium is a vegetable oil.

7. The process as defined by claim 1 with the added step of separating the bulk of the medium from the dried substance.

8. The process as defined by claim 1 wherein the substance dried is an egg product.

9. The process as defined by claim 2 wherein the substance dried is an egg product.

10. A process of drying an egg product which comprises dispersing the egg product in a non-aqueous, organic liquid medium which is not deleterious to the egg product and drying the egg product by evaporating water from the dispersion, while maintaining the dispersion at a temperature below that to which the egg product is sensitive, by passing a stream of a gas not harmful to the egg product through the dispersion while maintaining the egg product in a dispersed state.

11. The process as defined by claim 10 wherein the medium is an edible oil.

12. The process as defined by claim 11 wherein the egg product is egg white.

13. The process as defined by claim 11 wherein the egg product is egg yolk.

14. The process as defined by claim 11 wherein the egg product is egg white and it contains sucrose.

15. The process as defined by claim 11 wherein the egg product is egg yolk and it contains sucrose.

16. A process of drying egg white which comprises dissolving sucrose in egg white, dispersing the mixture in a vegetable oil, drying the egg white by evaporating water from the dispersion, while maintaining the dispersion at a temperature below that to which the egg white is sensitive, by passing a stream of air through the dispersion while maintaining the egg white in a dispersed state, separating the dried egg white from the oil and extracting residual oil from the dried egg white.

17. A process of drying egg yolk which comprises dissolving sucrose in egg yolk, dispersing the mixture in a vegetable oil, drying the egg yolk by evaporating water from the dispersion, while maintaining the dispersion at a temperature below that to which the egg yolk is sensitive, by passing a stream of air through the dispersion while maintaining the egg yolk in a dispersed state and separating the bulk of the oil from the dried egg yolk.

References Cited in the file of this patent

UNITED STATES PATENTS

| Number | Name | Date |
|---|---|---|
| 2,114,491 | Hollabaugh | Apr. 19, 1938 |
| 2,138,948 | Vesce | Nov. 29, 1938 |
| 2,354,495 | Bodenstein | July 25, 1944 |
| 2,420,517 | Brandner et al. | May 13, 1947 |
| 2,459,903 | Voorhees | Jan. 25, 1949 |